(12) United States Patent
Oroskar (10) Patent No.: US 9,185,606 B1
(45) Date of Patent: *Nov. 10, 2015

(54) ASSIGNMENT OF WIRELESS NETWORK RESOURCES

(71) Applicant: Sprint Spectrum L.P., Overland Park, KS (US)

(72) Inventor: Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 523 days.

This patent is subject to a terminal disclaimer.

(21) Appl. No.: 13/650,318

(22) Filed: Oct. 12, 2012

(51) Int. Cl.
*H04W 36/00* (2009.01)
*H04W 36/38* (2009.01)

(52) U.S. Cl.
CPC ............ *H04W 36/00* (2013.01); *H04W 36/38* (2013.01)

(58) Field of Classification Search
CPC ..... H04W 88/06; H04W 60/00; H04W 48/18; H04W 48/16; H04W 8/18; H04W 88/02; H04W 36/0061; H04W 36/22; H04W 36/24; H04W 36/00; H04W 36/38
See application file for complete search history.

(56) References Cited

U.S. PATENT DOCUMENTS

| | | | |
|---|---|---|---|
| 5,369,681 A | 11/1994 | Boudreau et al. | |
| 5,978,463 A | 11/1999 | Jurkevics et al. | |
| 6,055,236 A | 4/2000 | Nessett et al. | |
| 6,069,871 A | 5/2000 | Sharma et al. | |
| 6,181,945 B1 | 1/2001 | Lee | |
| 6,223,042 B1 | 4/2001 | Raffel | |
| 6,243,590 B1 | 6/2001 | Reddy et al. | |
| 6,353,614 B1 | 3/2002 | Borella et al. | |
| 6,353,891 B1 | 3/2002 | Borella et al. | |
| 6,496,867 B1 | 12/2002 | Beser et al. | |
| 6,523,068 B1 | 2/2003 | Beser et al. | |
| 6,549,787 B1 * | 4/2003 | Ravi | 455/525 |
| 6,556,831 B1 * | 4/2003 | Buppelmann | 455/456.2 |
| 6,567,405 B1 | 5/2003 | Borella et al. | |
| 6,594,481 B1 | 7/2003 | Johnson et al. | |
| 6,643,520 B1 | 11/2003 | Park et al. | |
| 6,697,354 B1 | 2/2004 | Borella et al. | |

(Continued)

FOREIGN PATENT DOCUMENTS

EP 2 244 502 10/2010
WO WO 2010104921 A1 * 9/2010

OTHER PUBLICATIONS

Office Action for U.S. Appl. No. 12/815,700 dated Dec. 14, 2011, 9 pages.

(Continued)

*Primary Examiner* — Matthew Sams (57) ABSTRACT

A RAN may be configured to receive a first call setup request relating to a first WCD, and a second call setup request relating to a second WCD. The first WCD may communicate using a first air-interface or a second air-interface, and the second WCD my communicate using the second air-interface and not the first air-interface. The RAN may determine that the first WCD and the second WCD are contending for a resource of a wireless coverage area defined using the second air-interface. Based on the first WCD and the second WCD contending for the resource, the first WCD communicating using the first air-interface or the second air-interface, and the second WCD communicating using the second air-interface and not the first air-interface, the RAN may assign the resource to the second WCD.

20 Claims, 7 Drawing Sheets

(56) References Cited

U.S. PATENT DOCUMENTS

| | | | |
|---|---|---|---|
| 6,708,219 | B1 | 3/2004 | Borella et al. |
| 6,731,642 | B1 | 5/2004 | Borella et al. |
| 6,745,039 | B1 | 6/2004 | Di Lalla |
| 6,781,982 | B1 | 8/2004 | Borella et al. |
| 6,798,786 | B1 | 9/2004 | Lo et al. |
| 6,822,957 | B1 | 11/2004 | Schuster et al. |
| 6,922,561 | B2 | 7/2005 | Chen et al. |
| 6,963,750 | B1 | 11/2005 | Cheng et al. |
| 6,978,128 | B1 | 12/2005 | Raman et al. |
| 6,996,621 | B1 | 2/2006 | Borella et al. |
| 7,031,275 | B1 | 4/2006 | Borella et al. |
| 7,032,242 | B1 | 4/2006 | Grabelsky et al. |
| 7,065,361 | B1 | 6/2006 | Fortuna |
| 7,171,492 | B1 | 1/2007 | Borella et al. |
| 7,177,658 | B2 | 2/2007 | Willenegger et al. |
| 7,218,618 | B2 | 5/2007 | Greis et al. |
| 7,260,415 | B1 | 8/2007 | Oh |
| 7,286,512 | B1 | 10/2007 | Borella |
| 7,349,699 | B1 | 3/2008 | Kelly et al. |
| 7,366,526 | B2 | 4/2008 | Zhang et al. |
| 7,558,588 | B2 | 7/2009 | To et al. |
| 7,573,873 | B1 | 8/2009 | Borella et al. |
| 7,693,526 | B2 | 4/2010 | Qian et al. |
| 7,768,998 | B1 | 8/2010 | Everson et al. |
| 7,873,346 | B2 | 1/2011 | Petersson et al. |
| 7,957,352 | B2 * | 6/2011 | Vanghi et al. ............. 370/335 |
| 7,962,148 | B2 * | 6/2011 | Stamoulis et al. .......... 455/453 |
| 8,180,345 | B2 * | 5/2012 | Klatt ......................... 455/436 |
| 8,340,704 | B2 * | 12/2012 | Hu ............................ 455/509 |
| 8,805,368 | B2 * | 8/2014 | Chan et al. ............. 455/435.3 |
| 8,873,508 | B1 * | 10/2014 | Oroskar ..................... 370/331 |
| 2004/0008627 | A1 | 1/2004 | Garg et al. |
| 2004/0037264 | A1 | 2/2004 | Khawand |
| 2004/0125768 | A1 | 7/2004 | Yoon et al. |
| 2004/0192306 | A1 | 9/2004 | Elkarat et al. |
| 2005/0261899 | A1 | 11/2005 | Brueck et al. |
| 2006/0058056 | A1 | 3/2006 | Das et al. |
| 2006/0094423 | A1 | 5/2006 | Sharma et al. |
| 2006/0116125 | A1 | 6/2006 | Buckley et al. |
| 2006/0142032 | A1 | 6/2006 | Derakhshan et al. |
| 2006/0142051 | A1 | 6/2006 | Purnadi et al. |
| 2006/0160551 | A1 | 7/2006 | Matoba et al. |
| 2006/0174015 | A1 | 8/2006 | Arauz-Rosado |
| 2006/0274685 | A1 | 12/2006 | Johnson et al. |
| 2007/0043558 | A1 | 2/2007 | Schwarz et al. |
| 2007/0053336 | A1 | 3/2007 | Petrovic et al. |
| 2007/0105535 | A1 | 5/2007 | Jacobson et al. |
| 2007/0173252 | A1 | 7/2007 | Jiang |
| 2007/0287414 | A1 | 12/2007 | Dawson et al. |
| 2007/0297377 | A1 | 12/2007 | McCann et al. |
| 2008/0025235 | A1 | 1/2008 | Mahany et al. |
| 2008/0032713 | A1 | 2/2008 | Yang |
| 2008/0080427 | A1 | 4/2008 | Suh et al. |
| 2008/0081623 | A1 | 4/2008 | Burgan et al. |
| 2008/0096520 | A1 | 4/2008 | Benco et al. |
| 2008/0108367 | A1 * | 5/2008 | Afrashteh et al. ......... 455/452.2 |
| 2008/0293419 | A1 | 11/2008 | Somasundaram et al. |
| 2008/0293437 | A1 | 11/2008 | Ranganathan et al. |
| 2009/0016328 | A1 | 1/2009 | Peisa et al. |
| 2009/0061854 | A1 | 3/2009 | Gillot et al. |
| 2009/0227262 | A1 * | 9/2009 | Gao ........................... 455/450 |
| 2009/0227277 | A1 | 9/2009 | Gupta et al. |
| 2009/0247137 | A1 | 10/2009 | Awad |
| 2009/0257400 | A1 | 10/2009 | Perras |
| 2009/0285113 | A1 | 11/2009 | Yavuz et al. |
| 2010/0120437 | A1 | 5/2010 | Foster et al. |
| 2010/0268674 | A1 | 10/2010 | Dwyer et al. |
| 2010/0311420 | A1 | 12/2010 | Reza et al. |
| 2010/0322171 | A1 | 12/2010 | Dekorsy et al. |
| 2011/0021197 | A1 | 1/2011 | Ngai |
| 2011/0034167 | A1 | 2/2011 | Ben-Shaul et al. |
| 2011/0217980 | A1 * | 9/2011 | Faurie et al. ............. 455/435.1 |
| 2012/0028661 | A1 | 2/2012 | Fang et al. |
| 2012/0064885 | A1 | 3/2012 | Ramachandran et al. |
| 2012/0231827 | A1 | 9/2012 | Oroskar et al. |

OTHER PUBLICATIONS

Vargantwar et al., U.S. Appl. No. 12/815,700, filed Jun. 15, 2010, 41 pages.
Shah et al., U.S. Appl. No. 12/553,661, filed Sep. 3, 2009, 33 pages.
Oroskar et al., U.S. Appl. No. 12/558,359, filed Sep. 11, 2009, 36 pages.
Oroskar et al., U.S. Appl. No. 12/572,829, filed Oct. 2, 2009, 40 pages.
Oroskar et al., U.S. Appl. No. 12/690,629, filed Jan. 20, 2010, 38 pages.
Oroskar et al., U.S. Appl. No. 12/756,027, filed Apr. 7, 2010, 34 pages.
Oroskar et al., U.S. Appl. No. 12/776,287, filed May 7, 2010, 36 pages.
Oroskar et al., U.S. Appl. No. 12/786,174, filed May 24, 2010, 42 pages.
Oroskar et al., U.S. Appl. No. 12/786,184, filed May 24, 2010, 42 pages.
Vondemkamp et al., U.S. Appl. No. 11/535,870, filed Sep. 27, 2006, 29 pages.
Office Action for U.S. Appl. No. 11/535,870 dated Apr. 3, 2009, 14 pages.
Final Office Action for U.S. Appl. No. 11/535,870 dated Nov. 12, 2009, 22 pages.
Advisory Action for U.S. Appl. No. 11/535,870 dated Feb. 18, 2010, 14 pages.
Office Action for U.S. Appl. No. 12/853,730 dated Jan. 18, 2012, 13 pages.
3rd Generation Partnership Project 2 "3GPP2", "Source-Controlled Variable-Rate Multimode Wideband Speech Codec (VMR-WB), Service Options 62 and 63 for Spread Spectrum Systems," 3GPP2 C.S0052-A, Version 1.0, Apr. 22, 2005, 198 pages.
Office Action for U.S. Appl. No. 12/815,709 dated Feb. 21, 2012, 5 pages.
Cai, L. et al., "Mitigating DoS Attacks on the Paging Channel by Efficient Encoding in Page Messages," In: Proceedings of 5th International ICST Conference on Security and Privacy in Communication Networks (SecureComm 2009) Sep. 2009, 20 pages.
TIA Standard, "Interoperability Test Specification for cdma2000® Air Interface," TIA-1036, Section 3.11, Jan. 2005, 4 pages.
TR45, "Inter-Operability Specification (IOS) for CDMA 2000 Access Network Interfaces," TIA/EIA/IS-2001-A, Sections 2.2.2.2, 3.4.1, 3.4.3.1.11, and 3.4.9, Jun. 2001, 24 pages.
Vargantwar et al., U.S. Appl. No. 12/815,709 dated Jun. 15, 2010, 42 pages.
Bhan et al., U.S. Appl. No. 12/261,229 dated Oct. 30, 2008, 55 pages.
Hasswa et al., "Generic Vertical Handoff Decision Function for Heterogeneous Wireless Networks," IFIP Int. Conf. Wireless and Optical Communications Network (WOCN), pp. 239-243 (Mar. 6, 2005).
NTT DoCoMo et al., "IDLE Mode Mobility Control Principles," 3GPP TSG RAN WG2 #59BIS; 3GPP Draft; R2-074001, 8 pages, Oct. 8-12, 2007.
NTT DoCoMo et al., "Load Balancing Solutions for LTE," 3GPP TSG RAN WG2 #58bis; 3GPP Draft; R2-072719, 5 pages, Jun. 22, 2007.
International Search Report and Written Report for PCT/US2012/028070 mailed May 7, 2012, 15 pages.
Office Action for U.S. Appl. No. 13/044,794 mailed Jul. 18, 2012, 21 pages.
"Enhanced Variable Rate Codec, Speech Service Options 3, 68, 70, and 73 for Wideband Spread Spectrum Digital Systems," 3GPP2 C.S0014-D, Version 1, pp. 1-1 through 9-24 (May 2009).
CouthIT, "EVRC-A," 1 page, May 18, 2012 (www.couthit.com/codec-evrc.asp).
CouthIT, "EVRC-B," 1 page, May 18, 2012 (www.couthit.com/codec-evrc-b.asp).
CouthIT, "EVRC-NW," 2 pages, May 18, 2012 (www.couthit.com/codec-evrc-nw.asp).
CouthIT, "EVRC-C, EVRC-WB," 2 pages, May 18, 2012 (www.couthit.com/codec-evrc-wb.asp).

(56) References Cited

OTHER PUBLICATIONS

Desineni et al., "RTP Payload Format for the Enhanced Variable Rate Wideband Codec (EVRC-WB) and the Media Subtype Updates for EVRC-B Codec," Network Working Group, pp. 1-25 (Feb. 2008).
Office Action for U.S. Appl. No. 12/847,198 mailed Oct. 2, 2012, 13 pages.
Notice of Allowance for U.S. Appl. No. 12/815,709 mailed Aug. 21, 2012, 8 pages.
Final Office Action for U.S. Appl. No. 12/815,700 mailed May 23, 2012, 11 pages.
WiMax Forum, "WiMAX End-to-End Network Systems Architecture (State 3: Detailed Protocols and Procedures)," Release 1, V&V Draft, Aug. 8, 2006, 333 pages.

\* cited by examiner

ASSIGNMENT OF WIRELESS NETWORK RESOURCES

BACKGROUND

To provide cellular wireless communication service, a wireless service provider, or "wireless carrier," typically operates a radio access network (RAN) that defines one or more coverage areas in which wireless communication devices (WCDs) can be served by the RAN, and can thereby obtain connectivity to broader networks such as the publically-switched telephone network (PSTN) and/or the Internet. A typical RAN may include one or more base transceiver stations (BTSs). These BTSs may be macro network cell towers and/or femtocells, each of which may radiate to define a cell and/or cell sectors through which WCDs can communicate. Further, the RAN may include one or more base station controllers (BSCs), which may be integrated with or otherwise in communication with the BTSs. The BSCs may include or be in communication with a switch or gateway that provides connectivity with one or more transport networks. With this arrangement, a cell phone, personal digital assistant, wirelessly equipped computer, or any other WCD that is positioned within coverage of the RAN can then communicate with a BTS and in turn, via the BTS, with other served devices or with other entities on the transport network.

OVERVIEW

In networks that provide service under both Long-Term Evolution (LTE) and Code Division Multiple Access (CDMA) protocols, service providers may support enhanced circuit-switched fallback (eCSFB) functionality, which allows service providers to use their existing CDMA network for circuit-switched voice calls, and use LTE to support packet-switched data calls for WCDs that support CDMA and LTE. Thus, when eCSFB is supported, a RAN may generally use its CDMA traffic channels for voice calls and some data calls, while using LTE traffic channels for other functionality.

Herein, WCDs that are capable of operating according to eCSFB may be referred to as "eCSFB devices" or "eCSFB WCDs." On the other hand, WCDs that are not capable of LTE communications may be referred to herein as "non-eCSFB devices" or "non-eCSFB WCDs." It should be noted that other devices exist that may support LTE only and might not support CDMA.

In a first example embodiment, a RAN may receive a first call setup request relating to a first WCD, and a second call setup request relating to a second WCD. The first WCD may be configured to communicate using a first air-interface or a second air-interface, and the second WCD may be configured to communicate using the second air-interface and not the first air-interface. The first WCD and the second WCD may be served by the RAN. For instance, the first WCD may be an eCSFB WCD and the second WCD may be a non-eCSFB WCD. Further, the first air-interface may operate in accordance with LTE, and the second air-interface may operate in accordance with CDMA. Additionally, it may be determined that the first WCD and the second WCD are contending for a resource of a wireless coverage area defined using the second air-interface. Based on the first WCD and the second WCD contending for the resource, the first WCD being configured to communicate using the first air-interface or the second air-interface, and the second WCD being configured to communicate using the second air-interface and not the first air-interface, the resource may be assigned to the second WCD.

For example, the RAN may be a CDMA RAN, and the resource may be a CDMA code (e.g., a Walsh code). In this example, the RAN may assign the CDMA code to the second WCD (e.g., the non-eCSFB device) and establish a circuit-switched (CS) call with the second WCD. Also, the RAN may provide to an LTE network an indication to establish a Voice Over Internet Protocol (VOIP) call with the first WCD (e.g., eCSFB device).

Alternatively or additionally, the RAN may comprise a CDMA component configured to communicate using the second air-interface, and an LTE component configured to communicate using the first air-interface. In this example, the resource contended for may be a CDMA code, and the CDMA component may be configured to assign the CDMA code to the second WCD. Also, in this example, the CDMA component may be configured to provide, to the LTE component, an indication to establish, with the first WCD, a VOIP call corresponding to the first call setup request. The LTE component may be configured to assign, to the first WCD, a respective resource of a respective wireless coverage area defined using the first air-interface and establish the VOIP call.

A second example embodiment may include a non-transitory computer-readable storage medium, having stored thereon program instructions that, upon execution by a RAN device, cause the RAN device to perform functions in accordance with the first example embodiment.

A third example embodiment may include a RAN device, comprising a processor and data storage. The data storage may contain program instructions executable by the processor to operate in accordance with the first example embodiment.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The following detailed description describes various features and functions of the disclosed systems, devices, and methods with reference to the accompanying figures. The illustrative system, device, and method embodiments described herein are not meant to be limiting. It may be readily understood that certain aspects of the disclosed systems, devices, and methods can be arranged and combined in a wide variety of different configurations, all of which are contemplated herein.

WCDs may be referred to as "mobile stations," as is common when referring to WCDs in the context of a CDMA network, and also as "user entities" (UEs), as is common when referring to WCDs in the context of an LTE network. Thus, the terms "mobile station," "wireless communication device" (or WCD), and/or "user entity" (or UE) may be used interchangeably.

Next-generation mobile communications systems may accommodate multiple radio access systems like CDMA, LTE, and wireless Local Area Networks (wireless LANs) in a partially or fully integrated manner. These systems may also provide WCD mobility among such systems. This mobility may provide transmission, reception and continuous communication even if the WCDs move about.

LTE is an emerging technology that may provide communication services using Internet Protocol (IP) possibly without existing circuit-switched domain functions. Accordingly, services like voice calls that have traditionally been provided over the circuit-switched domain may be replaced by VOIP, for example. This may require deployment of an IP Multimedia Subsystem (IMS) as a service control platform. The IP Multimedia Subsystem may refer to a communications system that integrates services provided by circuit-switched technology using Internet technology such as the Session Initiation Protocol or SIP, the Media Gateway Control Protocol (MGCP), the Real-time Transport Protocol (RTP), etc.

However, as LTE is being deployed, it may take some time before IMS and VOIP services can be provided in all target coverage areas. Even if VOIP is available for an LTE-capable WCD, it may still be desirable to use CDMA voice capabilities to conduct voice calls, because of the extensive CDMA infrastructure that is already deployed and because circuit-switched CDMA voice is a well understood and reasonably reliable technology. Thus, in one example, WCDs that are both CDMA- and LTE-capable may be configured to switch to CDMA when originating or receiving voice calls. This function, called "Circuit-Switched Fallback," or CSFB, for the LTE-capable WCDs, enables voice services for these WCDs using existing circuit-switched CDMA domain functions. Although CDMA is used herein as an example, other network protocols or standards such as Global System for Mobile Communications (GSM), Enhanced Data Rates for GSM Evolution (EDGE), General Packet Radio Service (GPRS), Worldwide Interoperability for Microwave Access (WiMAX), Evolution-Data Optimized (EV-DO) and Wideband CDMA (WCDMA) standards can be used instead or as well.

In some scenarios, CDMA resources may be limited. For instance, a RAN may determine that there is only one CDMA resource available in a given CDMA wireless coverage area, and that two WCDs are contending for the resource. A first WCD of the two WCDs may be an eCSFB device that can establish a given call using either CDMA resources or LTE resources. However, a second WCD of the two WCDs may be a non-eCSFB device that can establish a respective call using the CDMA resources, but not the LTE resources. Since the second WCD only supports CDMA, the RAN may assign the resource to the second WCD rather than risk a call failure with the second WCD, while the first WCD can establish a respective call using the LTE resources. Although this example involves two WCDs contending for a single resource, the process illustrated described can be applied to scenarios in which m WCDs are contending for n resources, where m>n. In this manner, a greater number of calls can be established when resources are scarce.

FIGS. 1-4 below describe example network architectures and configurations. It should be understood that network arrangements shown in FIGS. 1-4 below and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software.

I. Network Architecture

Figure 1:
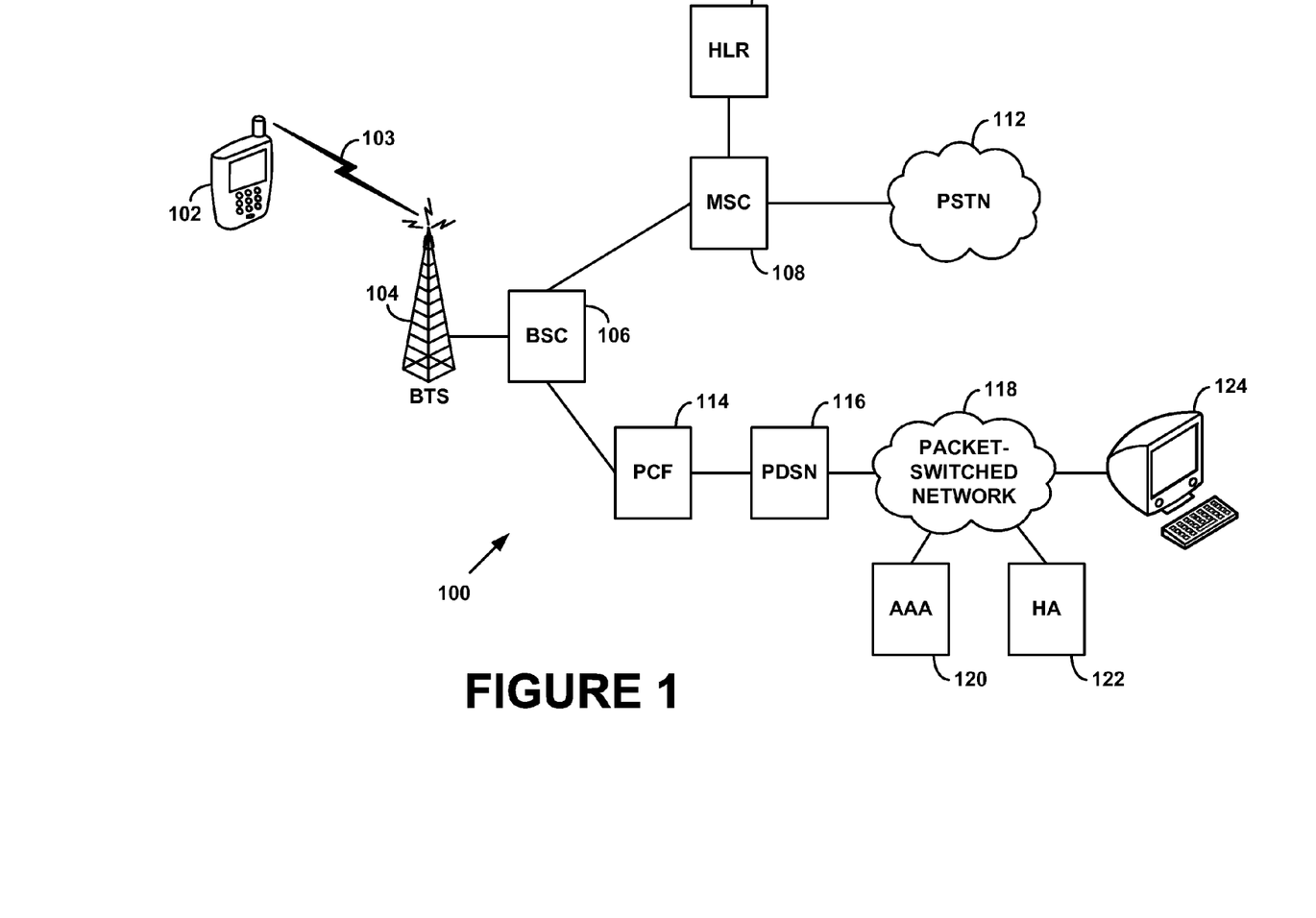
FIG. 1 illustrates a RAN, in accordance with an example embodiment.

FIG. 1 shows a simplified block diagram of a wireless communication system 100 in which example embodiments can be employed. WCD 102 may communicate over an air interface 103 with a BTS 104, which is, in turn, coupled to or integrated with a BSC 106. Transmissions over air interface 103 from BTS 104 to WCD 102 may represent a "forward link" to WCD 102. Conversely, transmissions over air interface 103 from WCD 102 to BTS 104 may represent a "reverse link" from WCD 102.

BSC 106 may be connected to a mobile switching center (MSC) 108. BSC 106, MSC 108, or both, may act to control assignment of air interface traffic channels to WCDs, and may provide access to wireless circuit-switched services such as circuit-voice and circuit-data services. As represented by its connection to publically-switched telephone network (PSTN) 112, MSC 108 may also be coupled with one or more other MSCs or other telephony circuit switches, thereby supporting user mobility across MSC regions, as well as local and long-distance landline telephone services. A home location register (HLR) 110, which may be connected to MSC 108, may support mobility-related aspects of subscriber services, including dynamic tracking of subscriber registration location and verification of service privileges.

As shown, BSC 106 may also be connected with a packet-data serving node (PDSN) 116 by way of a packet control function (PCF) 114. PDSN 116, in turn, provides connectivity with a packet-switched network 118, such as the Internet and/or a wireless carrier's private core packet-network. Nodes on network 118 may include, by way of example, an authentication, authorization, and accounting (AAA) server 120, a mobile-IP home agent (HA) 122, and a remote computer 124. After acquiring a traffic channel over air interface 103, WCD 102 may transmit a request to PDSN 116 for a connection to the packet data network. Then, following authentication of WCD 102 by AAA server 120, WCD 102 may be assigned an IP address by PDSN 116 or by HA 122, and may thereafter engage in packet-data communications with entities such as remote computer 124.

In some deployments, the combination of elements including BTS 104, BSC 106, and MSC 108 may be referred to as a RAN. However, a RAN may contain more or fewer elements. For instance, some RANs may also include HLR 110, PCF 114, PDSN 116, and/or other elements not shown in FIG. 1.

Figure 2:
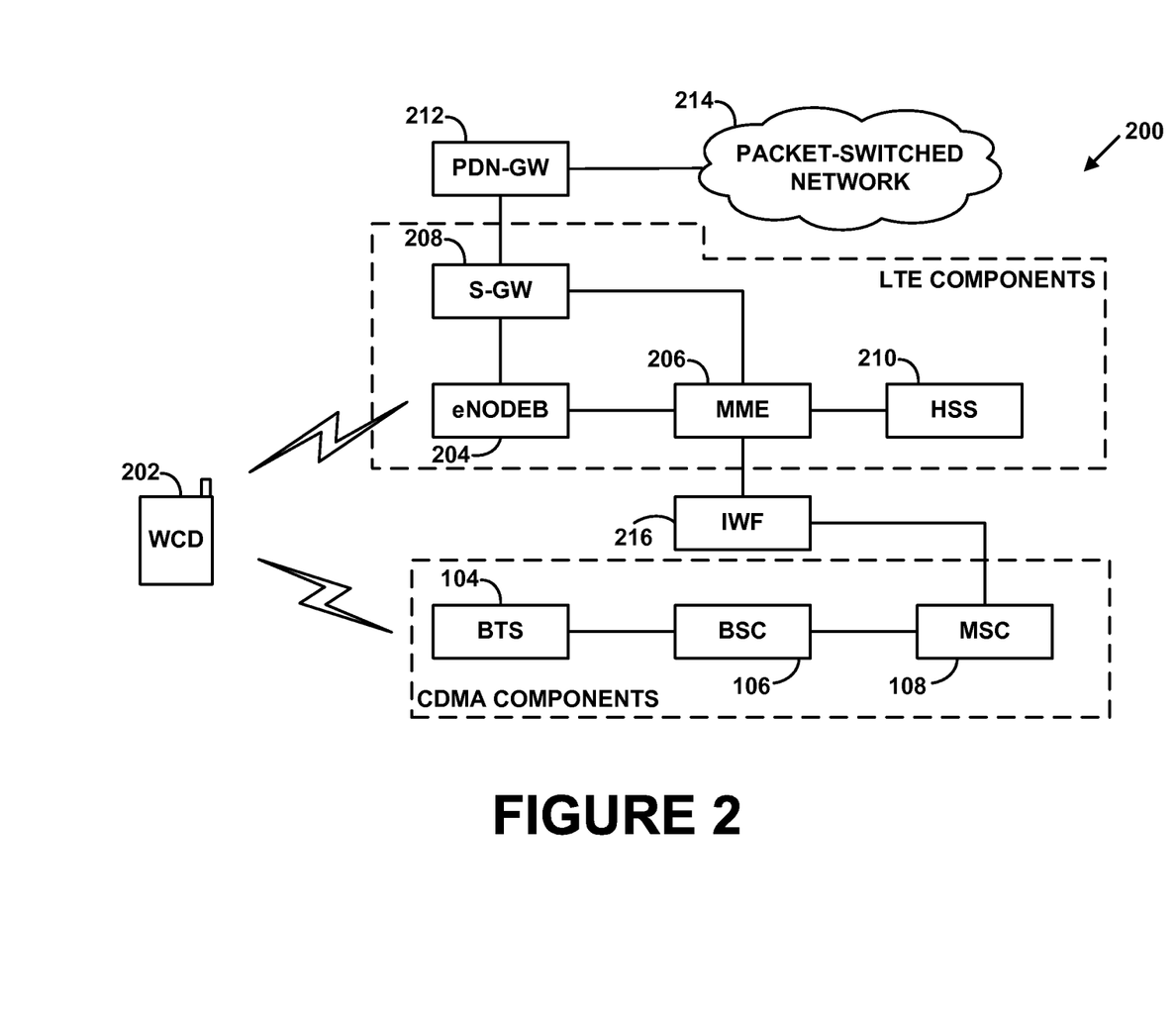
FIG. 2 is a block diagram of a wireless communication network, in accordance with an example embodiment.

FIG. 2 is a block diagram of a wireless communication network 200 in which a service provider may support wireless service under two or more different air-interface protocols, in accordance with an example embodiment. In particular, FIG. 2 shows an example RAN that includes CDMA components, such as the CDMA components described in FIG. 1, and LTE components. LTE may be characterized as exhibiting relatively high speed data transmission, while CDMA may be characterized as exhibiting relatively high quality circuit-switched voice calls, for example. As such, a WCD 202 operating in network 200 may connect and communicate using different air-interface protocols, such as CDMA and LTE. In practice, network 200 may include two or more separate access networks with at least partially overlapping wireless coverage areas (e.g., separate access networks for LTE and CDMA). Alternatively, some or all components may be combined so as to support both CDMA and LTE communications.

In the illustrated configuration, network 200 includes components to provide for CDMA communications. Specifically, FIG. 2 shows BTS 104, BSC 106, and MSC 108, which collectively, and possibly in conjunction with other components that help to provide service under CDMA, may be referred to as a CDMA network as described with respect to FIG. 1.

Network 200 also includes components to provide WCD 202 with service using LTE. In particular, network 200 includes one or more eNodeBs 204, which may include base stations configured to support over-the-air communications with WCD 202. Thus, eNodeB 204 may be an LTE analog of BTS 104 of the CDMA network. Each eNodeB 204 may provide service using LTE in one or more wireless coverage areas, such as a cell or one or more cell-sectors.

Network 200 also includes a mobility management entity (MME) 206, which may be configured to control communications between one or more eNodeBs 204 and a serving gateway (S-GW) 208. MME 206 may also be communicatively coupled to a home subscriber server (HSS) 210, which stores subscriber information, such as information related to WCD 202. More generally, MME 206 may support functionality such as mobility management, bearer management, paging message distribution, security functions, authentication of WCDs, gateway selection for communications, and so on.

In an example configuration, S-GW 208 may be configured to communicate with eNodeBs 204 and/or with MME 206 in order to provide various functions such as packet routing and forwarding, mobility anchoring, packet buffering, and so on. For instance, S-GW 208 may provide packet routing for LTE communications to and/or from WCD 202. Thus, functionality of MME 206 and S-GW 208 may be an LTE analog of some functionality of MSC 108 of the CDMA network.

Yet further, an LTE access network may include a packet data network gateway (PDN-GW) 212, which facilitates packet-data communications between S-GW 208 that operates according to LTE, and packet-switched network 214.

In a further aspect, network 200 may include an interworking function (IWF) 216, which may be a functional component of network 200 that supports interworking between different wireless technologies, such as CDMA and LTE. In an example configuration, IWF 216 may support communications between components of an LTE network (e.g., MME 206) and components of a CDMA network (e.g., MSC 108), so that a service provider may implement enhanced circuit-switched fallback (eCSFB) functionality among other functionalities.

Network 200 illustrates LTE and CDMA components as one example. Any other type of components for other network standards such as WiFi, GSM, GPRS, EDGE, WiMAX, EV-DO, and WCDMA are possible.

II. Example Network Configurations

Figure 3A:
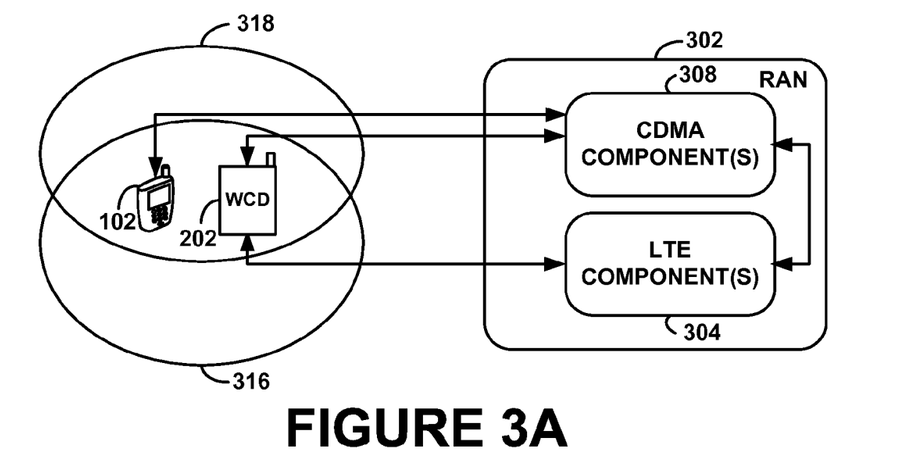
FIG. 3A illustrates a RAN that includes an LTE component and a CDMA component, in accordance with an example embodiment.
Figure 3B:
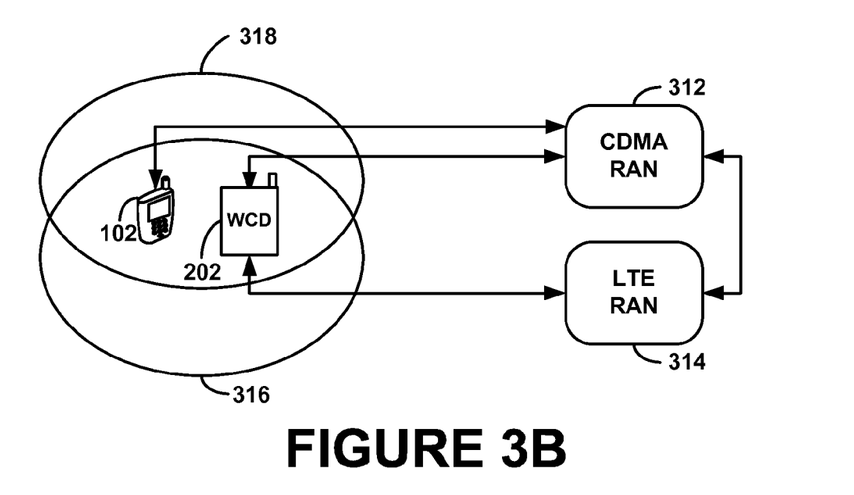
FIG. 3B illustrates a CDMA RAN in communication with an LTE RAN, in accordance with an example embodiment.

FIGS. 3A and 3B illustrate example network configurations for network 200. FIG. 3A illustrates a RAN 302 that includes LTE component(s) 304 configured to communicate with WCD 202, and CDMA component(s) 308 configured to communicate with WCD 202 and WCD 102, in accordance with an example embodiment. LTE component(s) 304 and CDMA component(s) 308 may be in communication with each other through an IWF such as IWF 216 in FIG. 2. WCD 102 may be configured to communicate with CDMA component(s) 308 but not with LTE component(s) 304, and WCD 202 may be configured to communicate with both CDMA components(s) 308 and LTE component(s) 304.

CDMA component(s) 308 may include, for example, BTS 104, BSC 106, and MSC 108. LTE component(s) 304 may include, for example, eNodeB 204, MME 206, HSS 210, and S-GW 208. CDMA component(s) 308 and/or LTE component(s) 304 may include other modules not shown as well.

FIG. 3B illustrates another configuration where a CDMA RAN 312 may be configured to communicate with WCD 202 and WCD 102, and an LTE RAN 314 may be configured to communicate with WCD 202. LTE RAN 314 and CDMA RAN 312 may be configured to communicate with each other as well. In FIG. 3B, WCD 102 may be configured to communicate with CDMA RAN 312 but not with LTE RAN 314, and WCD 202 may be configured to communicate with both CDMA RAN 312 and LTE RAN 314.

CDMA RAN 312 may include, for example, BTS 104, BSC 106, and MSC 108. LTE RAN 314 may include, for example, eNodeB 204, MME 206, HSS 210, and S-GW 208. CDMA RAN 312 and LTE RAN 314 may include other components not shown.

FIG. 3A may represent a configuration where equipment related to CDMA component(s) 308 may have already been deployed in RAN 302 and a service provider has added equipment related to LTE component(s) 304 or has upgraded equipment related to CDMA component(s) 308 to make RAN 302 LTE-capable as well. FIG. 3B may represent a configuration where the service provider has deployed equipment related to LTE network 314 separate from equipment related to CDMA network 312. Other configurations are possible, including configurations that combine aspects of FIGS. 3A and 3B.

In FIGS. 3A and 3B, a first wireless coverage area 316 may be defined using an air-interface associated with the LTE component(s) 304 or the LTE RAN 314, and a second wireless coverage area 318 may be defined using an air-interface associated with the CDMA component(s) 308 or the CDMA RAN 312. Both the WCD 102 and the WCD 202 may be covered by both wireless coverage areas 316 and 318.

III. RAN Device

Figure 4:
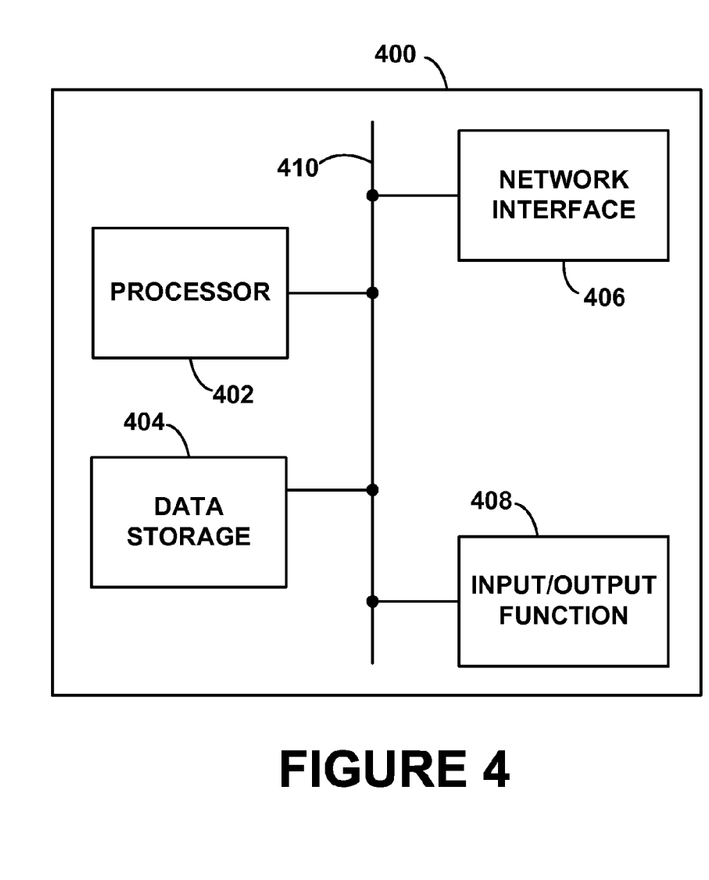
FIG. 4 is a block diagram of a RAN device, in accordance with an example embodiment.

FIG. 4 is a block diagram of an example RAN device 400, illustrating some of the functional components that could be included in a RAN device arranged to operate in accordance with the embodiments herein. Example RAN device 400 could be any type of device found in or associated with a RAN, such as a BTS, a BSC, an MSC, eNodeB, MME, S-GW, an IWF, etc. Thus, it should be understood that the description of RAN device 400 could apply to one or more components used for the purposes described herein.

In this example, RAN device 400 includes a processor 402, a data storage 404, a network interface 406, and an input/output function 408, all of which may be coupled by a system bus 410 or a similar mechanism. Processor 402 can include one or more CPUs, such as one or more general purpose processors and/or one or more dedicated processors (e.g., application specific integrated circuits (ASICs) or digital signal processors (DSPs), etc.).

Data storage 404, in turn, may comprise volatile and/or non-volatile data storage and can be integrated in whole or in part with processor 402. Data storage 404 can hold program instructions, executable by processor 402, and data that may be manipulated by these instructions to carry out the various methods, processes, or functions described herein. Alternatively, these methods, processes, or functions can be defined by hardware, firmware, and/or any combination of hardware, firmware and software. By way of example, the data in data storage 404 may contain program instructions, perhaps stored on a non-transitory computer-readable medium, executable by processor 402 to carry out any of the methods, processes, or functions disclosed in this specification or the accompanying drawings.

Network interface 406 may take the form of a wireline connection, such as an Ethernet, Token Ring, or T-carrier connection. Network interface 406 may also take the form of a wireless connection, such as IEEE 802.11 (Wifi), BLUETOOTH®, or a wide-area wireless connection. However, other forms of physical layer connections and other types of standard or proprietary communication protocols may be used over network interface 406. Furthermore, network interface 406 may comprise multiple physical interfaces.

Input/output function 408 may facilitate user interaction with example RAN device 400. Input/output function 408 may comprise multiple types of input devices, such as a keyboard, a mouse, a touch screen, and so on. Similarly, input/output function 408 may comprise multiple types of output devices, such as a monitor, printer, or one or more light emitting diodes (LEDs). Additionally or alternatively, RAN device 400 may support remote access from another device, via the network interface 406 or via another interface (not shown), such an RS-232 or USB port.

IV. CDMA Communications

For purposes of illustration, an example embodiment that uses CDMA communications will be described. However, it should be understood that other examples could use other protocols and/or functions now known or developed in the future.

In a CDMA wireless network, each wireless coverage area may employ one or more frequency bands, typically 1.25 MHz in bandwidth each, and each wireless coverage area may be distinguished from adjacent wireless coverage areas by a pseudo-random number offset ("PN offset"). Further, each wireless coverage area may concurrently communicate on multiple channels that are distinguished from one another by different CDMA codes (i.e., different Walsh codes). When a WCD operates in a given wireless coverage area, communications between the WCD and the BTS of the wireless coverage area may be carried on a given frequency and may also be encoded (e.g., modulated) by the wireless coverage area's PN offset and a given Walsh code.

Air interface communications in a wireless coverage area may be divided into forward link communications and reverse link communications. On the forward link, certain Walsh codes may be reserved for defining control channels, including a pilot channel, a sync channel, and one or more paging channels, and the remainder may be allocated dynamically for use as traffic channels, i.e., to carry bearer data such as email, web browsing, voice, video, and so on. Similarly, on the reverse link, one or more offsets of a CDMA code (i.e., offsets of a PN long code) may be reserved for defining control channels, such as access channels, and the remaining offsets may be allocated dynamically to WCDs for use as traffic channels.

Channel assignment to WCDs, which typically involves allocating one or more resources of a wireless coverage area to the WCDs, may occur when a new call (e.g., a voice, video, music, and/or data session) is established involving the WCD, or when the WCD hands off to a different wireless coverage area.

Each BTS of a RAN may emit a pilot channel signal in each wireless coverage area the respective BTS defines. Based on these pilot channel signals, an idle WCD (e.g., a WCD not involved in a call) may associate with a primary wireless coverage area, and then listen to the paging channel of the primary wireless coverage area for incoming call indications, and other information, from the RAN. The RAN may transmit system parameter messages and/or neighbor list update messages to the WCD via this primary paging channel. These messages may identify PN offsets of the pilot channels emitted by BTSs that define neighboring wireless coverage areas (e.g., wireless coverage areas defined by the RAN's BTSs or wireless coverage areas defined by nearby BTSs in different RANs).

An idle WCD may measure the pilot channel signal strength that it receives from each of these neighboring wireless coverage areas. If, for some period of time, the WCD receives pilot channel signals from a neighboring wireless coverage area at a greater strength than the WCD receives pilot channel signals from the primary wireless coverage area, the WCD may hand off to the neighboring wireless coverage area. To do so, the WCD may stop listening to the primary wireless coverage area's paging channel and associate with the neighboring wireless coverage area. Accordingly, the WCD may begin listening to the neighboring wireless coverage area's paging channel, and may transmit a radio environment report message to the RAN, via the neighboring wireless coverage area's access channel, indicating the handoff. In this way, the neighboring wireless coverage area becomes the WCD's new primary wireless coverage area.

When the WCD seeks to engage in a voice or data call, the WCD may use the primary wireless coverage area's paging channel and access channel to set up the call. For example, when an idle WCD originates a new outgoing call (i.e., the WCD is the caller), the WCD may transmit one or more origination, or probe, messages to the RAN via the access channel of the primary wireless coverage area. The RAN may respond by assigning a forward-direction traffic channel to the WCD, and transmitting, via the paging channel, an indication of this assignment (e.g., a Walsh code of the assigned traffic channel). This transmission may take the form of a channel assignment message directed to the WCD. Then, the WCD may use the assigned traffic channel for receiving bearer traffic for the voice or data call.

On the other hand, when an idle WCD is the recipient of a new incoming call (i.e., the WCD is the callee), the RAN may transmit a page request message to the WCD on the paging channel of the primary wireless coverage area. In response to receiving the page request message, the WCD may transmit, to the RAN, a page response message via the primary wireless coverage area's access channel. Similar to how outgoing calls are set up, the RAN may respond by assigning a forward-direction traffic channel to the WCD, and transmitting, via the paging channel, an indication of this assignment (e.g., a Walsh code of the assigned traffic channel) to the WCD in a channel assignment message. Then, the WCD may use the assigned traffic channel for receiving bearer traffic.

The WCD may transmit bearer traffic to the RAN on a reverse traffic channel by applying the WCD's assigned PN long code offset to a PN long code. The WCD may then modulate the bearer traffic according to the resulting point in the PN long code.

V. LTE Communications

In an LTE network, air interface communications in each coverage area of the LTE network may be encoded or carried in a manner that distinguishes the communications in that coverage area from communications in adjacent coverage areas. For example, each coverage area of the LTE network may have a respective identifier ("cell ID" or "sector ID") that is broadcast in a synchronization signal to distinguish the coverage area from adjacent coverage areas.

To enable a WCD to select an appropriate coverage area in which to operate, eNodeBs (i.e., base stations) of the LTE network may be arranged to broadcast, in each of their coverage areas, a respective pilot signal (or "reference signal"). Further, the LTE network may have a particular network identifier, such as a public land mobile network (PLMN) ID or a carrier frequency on which the system operates, and the eNodeBs in the LTE network may broadcast their pilot signals using that identifier or may separately broadcast an indication of the network identifier. For example, the eNodeBs may broadcast an overhead message such as an LTE "master information block." The WCD may then scan for and evaluate the strength of any detected the pilot signals, and the WCD may then seek to operate in the coverage area broadcasting the strongest pilot signal. For instance, the WCD may transmit, on a reverse link control channel in that coverage area, a registration request or attach request. The serving eNodeB and associated equipment may process the registration and transmit, on a forward link control channel, a registration acknowledgement message. Further, once initially registered in a coverage area, the WCD may continue to monitor the pilot signal of that coverage area as well as the pilot signals of adjacent coverage areas and compare the pilot signals to each other, to help ensure that the WCD continues to operate in the coverage area that provides a reasonably strong coverage.

To initiate a call (e.g., voice call, data session, or other type of call) when operating in a coverage area, the WCD may transmit, on a reverse link access channel of the coverage area, an origination request requesting the serving eNodeB to allocate resources for the call. The eNodeB may then reserve resources for the call and transmit, on a forward link control channel, a directive for the WCD to proceed with the communication using LTE air-interface resources (such as a particular air-interface traffic channel, timeslots, or resource blocks). Likewise, if the eNodeB or associated equipment receives a request to connect a call to the WCD, the eNodeB may transmit, on a forward link control channel, a page message for the WCD. The WCD may receive and respond to that page message to facilitate setup of the call.

During an ongoing call in a coverage area, the WCD may also continue to monitor the pilot signal of that coverage area and the pilot signals of adjacent coverage areas. For instance, the WCD may regularly measure signal strength that the WCD receives from its serving coverage area and from adjacent coverage areas and may regularly report the signal strength level(s) in radio measurement reports to its serving eNodeB. If appropriate, the eNodeB or associated equipment may then arrange for handoff of the WCD to another coverage area. For instance, if the WCD reports a sufficiently stronger signal from an adjacent coverage area, the eNodeB or associated equipment may arrange a transfer of the call to the adjacent coverage area and may send a handoff direction message to the WCD, instructing the WCD to continue the call in the adjacent coverage area.

Furthermore, the WCD might not only hand off between LTE coverage areas, but may also hand off from the LTE network to a CDMA network. Handoff between different air interface protocols may be referred to as "vertical" handoff.

For either LTE or CDMA, a call initiated by a given WCD may be referred to as a mobile-originated call, and a call received by the given WCD may be referred to as a mobile-terminated call.

VI. Example Message Flows

Figure 5:
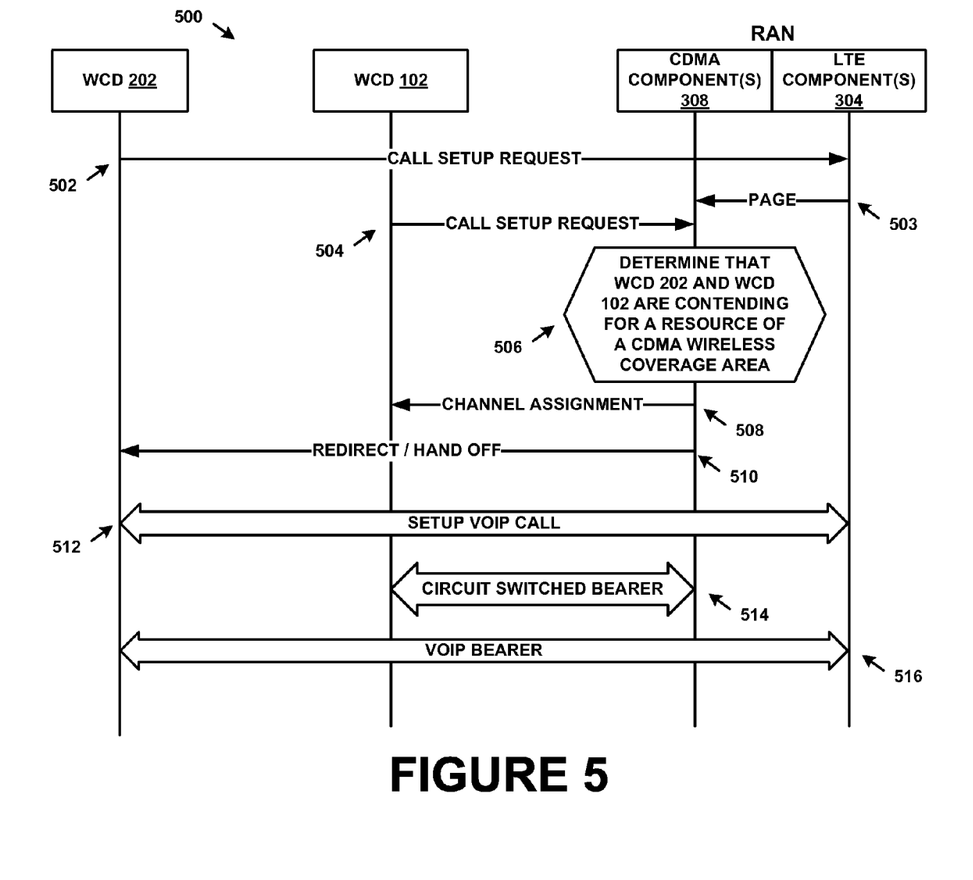
FIG. 5 is a message flow diagram, in accordance with an example embodiment.

FIG. 5 illustrates a message flow 500 for a mobile-originated call when an eCSFB WCD and a non-eCSFB device are contending for a resource. FIG. 5 involves WCD 202, WCD 102, and LTE RAN component(s) 304, and CDMA RAN component(s) 308. WCD 202 may be designated as an eCSFB device at both CDMA component(s) 308 and LTE component(s) 304, while WCD 102 may be designated as a non-eCSFB device at CDMA component(s) 308, for example. Although FIG. 5 illustrates a RAN as illustrated in FIG. 3A including LTE component(s) 304, and CDMA component(s) 308, description of the respective steps in FIG. 5 can apply to the configuration illustrated in FIG. 3B with CDMA RAN 312, and LTE RAN 314 instead of CDMA component(s) 308, and LTE component(s) 304, respectively, or some combination thereof, or other RAN components of different communication standards.

At step 502, WCD 202 provides a call setup request to LTE component(s) 304 indicating that WCD 202 is originating a call. At step 503, LTE component(s) 304 may page or communicate with CDMA component(s) 308 (e.g., via an IWF such as IWF 216 in FIG. 3) to provide an indication of the call setup request of WCD 202, so that the call can be set up using resources of CDMA component(s) 308. This may be done because circuit-switched CDMA voice is a well understood and reasonably reliable technology.

FIG. 5 illustrates the call setup request of WCD 202 being received at LTE component(s) 304 and LTE component(s) 304 paging CDMA component(s) 308. However, in another configuration, the call setup request of WCD 202 may be received directly at CDMA component(s) 308.

At step 504, CDMA component(s) 308 may receive a call setup request from WCD 102. Although step 504 is shown after step 503, in alternative configurations the call setup request of step 504 may occur before step 503 or before step 502.

At step 506, CDMA component(s) 308 may determine that there is only one resource available in a given CDMA wireless coverage area, and that WCD 202 and WCD 102 are contending for the resource. WCD 202 can establish a given call using either CDMA resources or LTE resources; however, WCD 102 can establish a respective call using the CDMA resources, but not the LTE resources. Therefore, at step 508, CDMA component(s) 308 may assign the resource to WCD 102 rather than risk a call failure for WCD 102. Thus, CDMA component(s) 308 may assign a traffic channel to WCD 102 in preparation for establishing a call corresponding to the call setup request of WCD 102. Although message flow 500 involves two WCDs contending for a single resource, the process illustrated in message flow 500 can be applied to scenarios in which m WCDs are contending for n resources, where m>n.

At step 510, CDMA component(s) 308 may redirect or hand off WCD 202 to LTE component(s) 304. Step 510 may involve multiple sub-steps. For example, an MSC such as MSC 108 may send a handoff request to a BSC such as BSC 106. The BSC may send a handoff request acknowledgment back to the MSC. Further, CDMA component(s) 308 may send a signal through an IWF such as IWF 216 to an MME such as MME 206 of LTE component(s) 304. CDMA component(s) 308 may receive back from MME 206, through IWF 216, an indication that handoff commenced. Other messages may also be included as part of step 510.

As mentioned above, WCD 202 may be designated as an eCSFB device at CDMA component(s) 308 and thus capable of establishing calls using LTE component(s) 304 as well as CDMA component(s) 308. For example, at step 510, CDMA component(s) 308 may provide information to LTE component(s) 304 and/or WCD 202 indicating that CDMA resources are not available to establish a respective call corresponding to the call setup request of WCD 202. In another example, LTE component(s) 304 may determine that such contention for the resource occurred. Accordingly, at step 512 data may be exchanged between LTE component(s) 304 and WCD 202 to set up a VOIP call.

Based on the decision to assign the CDMA resource to WCD 102, at step 514, CDMA component(s) 308 may establish a call with WCD 102 and exchange circuit-switched bearer traffic. For instance, this may involve exchanging bearer traffic using CDMA network resources. Also, based on the decision to assign the CDMA resource to WCD 102, at step 516, LTE component(s) 304 may be configured to establish a VOIP call with WCD 202 and exchange VOIP bearer traffic. Thus, two respective calls corresponding to the two call setup requests received at steps 502 and 504 can be established.

Although steps 508-516 are shown in a given order, these steps may be performed in other orders. For example, step 514 may be carried out by CDMA component(s) 308 after step 508 (i.e., channel assignment to WCD 102) and before step 510. Other arrangements of the steps of the message flow 500 are also possible. The order described herein is for illustration only. Further, throughout message flow 500, the names of the messages are used for purposes of convenience and messages with other names may be used for the same or similar purposes.

Figure 6:
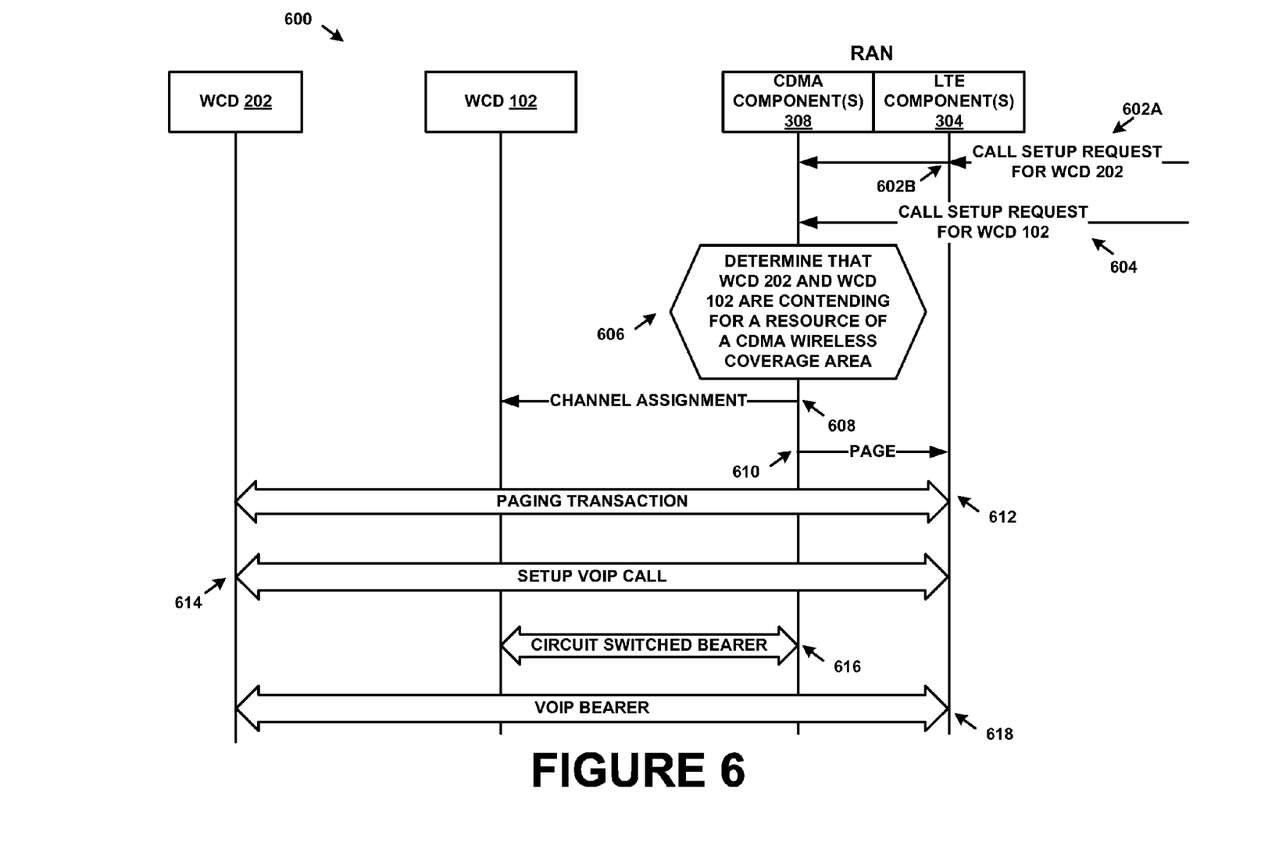
FIG. 6 is another message flow diagram, in accordance with an example embodiment.

FIG. 6 illustrates a message flow 600 for a mobile-terminated call, in accordance with an example embodiment. As described above with respect to FIG. 5, WCD 202 may be designated as an eCSFB device at both CDMA component(s) 308 and LTE component(s) 304, while WCD 102 may be designated as a non-eCSFB device at CDMA component(s) 308, for example. Although FIG. 6 illustrates a RAN including LTE component(s) 304 and CDMA component(s) 308 as described in FIG. 3A, description of the respective steps in FIG. 6 may apply to the configuration illustrated in FIG. 3B with CDMA RAN 312, and LTE RAN 314 instead of CDMA component(s) 308, and LTE component(s) 304, respectively.

At step 602A, LTE component(s) 304 may receive a call setup request for WCD 202. At step 602B, LTE component(s) 304 may page or communicate with CDMA component(s) 308 to provide an indication of the call setup request for WCD 202 such that the call can be set up using CDMA resources related to or controlled by CDMA component(s) 308.

At step 604, CDMA component(s) 308 may receive a call setup request for WCD 102. Although step 604 is shown after steps 602A and 602B, in alternative configurations the call setup request of step 604 may occur before step steps 602A and 602B.

At step 606, CDMA component(s) 308 may determine that there is only one resource available in a given CDMA wireless coverage area, and determine that WCD 202 and WCD 102 are contending for the resource. WCD 202 can engage in a given call using either CDMA resources or LTE resources; however, WCD 102 can engage in a respective call using the CDMA resources, but not the LTE resources. Therefore, at step 608, CDMA component(s) 308 may assign the resource to WCD 102 rather than risk a call failure with WCD 102. Thus, CDMA component(s) 308 may assign a traffic channel to WCD 102 in preparation for establishing a call corresponding to the call setup request of WCD 102. Although message flow 600 involves two WCDs contending for a single resource, the process illustrated in message flow 600 can be applied to scenarios in which m WCDs are contending for n resources, where m>n.

At step 610, CDMA component(s) 308 may page, respond to a page, or communicate with LTE component(s) 304 to provide an indication of unavailability of CDMA resources for the call setup request for WCD 202. Accordingly, at step 612, a paging transaction may take place between LTE component(s) 304 and WCD 202 in preparation for establishing the VOIP call. At step 614 data may be exchanged between LTE component(s) 304 and WCD 202 to set up the VOIP call. In some examples, steps 612 and 614 can be combined into a single step.

Based on the decision to assign the CDMA resource to WCD 102, at step 616, CDMA component(s) 308 may establish a call with WCD 102 and exchange circuit-switched bearer traffic. For instance, this may involve exchanging bearer traffic using CDMA network resources. Also, based on the decision to assign the CDMA resource to WCD 102, at step 618, LTE component(s) 304 may be configured to establish a VOIP call with WCD 202 and exchange VOIP bearer traffic. Thus, two respective calls corresponding to the two call setup requests received at steps 502 and 504 can be established.

Although steps 608-618 are shown in a given order, these steps may be performed in an alternative order. For example, step 616 may be implemented by CDMA component(s) 308 after step 608 (i.e., channel assignment to WCD 102). Other arrangements of the steps of the message flow 600 are also possible. The order described herein is for illustration only. Further, throughout message flow 600, the names of these messages are used for purposes of convenience and messages with other names may be used for the same or similar purposes.

Functions described in FIGS. 5 and 6 to be performed by CDMA component(s) 308 can be performed by CDMA RAN 312, RAN 100 in FIG. 1, or the CDMA components described in FIG. 2. Similarly, functions described in FIGS. 5 and 6 to be performed by LTE component(s) 304 can be performed by LTE RAN 314 or the LTE network described in FIG. 2. Also, FIGS. 5 and 6 can be combined. For example, a RAN may receive one call setup request related to a mobile-terminated call and another request related to a mobile-originated call, and the two requests may involve contention for a single resource as described in FIGS. 5 and 6.

VII. Example Operations

Figure 7:
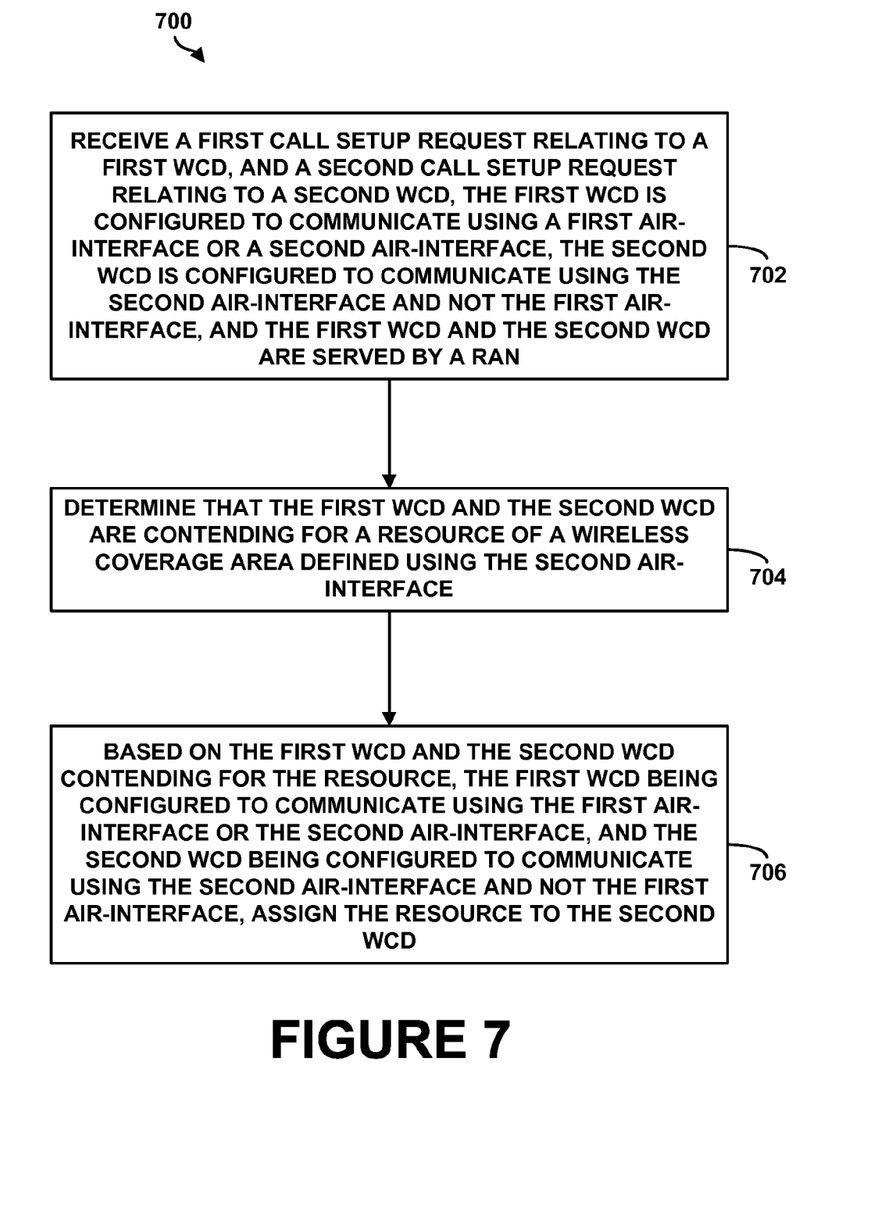
FIG. 7 is a flow chart, in accordance with an example embodiment.

FIG. 7 is a flow chart 700 illustrating assignment of network resources, in accordance with an example embodiment. Although flow chart 700 involves two WCDs contending for a single resource, the process illustrated in flow chart 700 can be applied to scenarios in which m WCDs are contending for n resources, where m>n.

Flow chart 700 may include one or more operations, functions, or actions as illustrated by one or more of blocks 702-706. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, flow chart 700 shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, flow chart 700 and other processes and methods disclosed herein, each block in FIG. 7 may represent circuitry that is configured to perform the specific logical functions in the process.

At block 702, a first call setup request relating to a first WCD, and a second call setup request relating to a second WCD may be received. The first WCD may be configured to communicate using a first air-interface or a second air-interface, and the second WCD may be configured to communicate using the second air-interface and not the first air-interface. The first WCD and the second WCD may be served by a RAN. Either WCD may be the originator or receiver of the respective call setup request.

As examples for illustration, the first air-interface may operate in accordance with LTE, and the second air-interface may operate in accordance with CDMA. In this example, the first WCD may be an eCSFB device configured for communication using LTE and CDMA, while the second WCD may be a non-eCSFB device configured for communication using CDMA but not configured to communicate using LTE.

At block 704, it may be determined that that the first WCD and the second WCD are contending for a resource of a wireless coverage area defined using the second air-interface. This resource may be, for example, a Walsh code, or any other type of resource that a RAN allocates to WCDs. In determining that the WCDs are contending for the resource, the RAN may establish that the resource is the only remaining resource of its type available in the given sector. Therefore the RAN may be limited to allocating the resource to only one of the WCDs.

At block 706, based on the first WCD and the second WCD contending for the resource, the first WCD being configured to communicate using the first air-interface or the second air-interface, and the second WCD being configured to communicate using the second air-interface and not the first air-interface, the resource may be assigned to the second WCD.

For instance, the first WCD may be configured to communicate using CDMA or LTE component, and the second WCD may be configured to communicate using CDMA, but not LTE. Thus, to establish a call corresponding to the first call setup request relating to the first WCD and a respective call corresponding to the second call setup request relating to the second WCD, the RAN may be configured to allocate or assign the only resource available in the wireless coverage area to the second WCD. Also, the RAN may be configured to provide to an LTE RAN or component information indicating that the first WCD may not establish the call corresponding to the first call setup request using the CDMA resource. In this manner, the LTE RAN or component may be configured to establish a VOIP call, or Voice Over LTE (VoLTE) call with the first WCD. Thus, both the first WCD and the second WCD may establish calls corresponding to the first call setup request and the second call setup request, respectively.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:

a radio access network (RAN) receiving (i) a first call setup request relating to a first wireless communication device (WCD), and (ii) a second call setup request relating to a second WCD, wherein the first WCD is configured to communicate using a first air-interface protocol and is configured to communicate using a second air-interface protocol different from the first air-interface protocol, wherein the second WCD is configured to communicate using the second air-interface protocol and not the first air-interface protocol, and wherein the first WCD and the second WCD are served by the RAN;

determining that the first WCD and the second WCD are contending for a resource of a wireless coverage area defined using the second air-interface protocol; and based on (i) the first WCD and the second WCD contending for the resource, (ii) the first WCD being configured to communicate using the first air-interface protocol and being configured to communicate using the second air-interface protocol, and (iii) the second WCD being configured to communicate using the second air-interface protocol and not the first air-interface protocol, assigning the resource to the second WCD.

2. The method of claim 1, wherein the first air-interface protocol is Long-Term Evolution (LTE), and wherein the second air-interface protocol is Code Division Multiple Access (CDMA).

3. The method of claim 2, wherein the RAN is a CDMA RAN, and the resource comprises a CDMA code.

4. The method of claim 3, wherein determining that the first WCD and the second WCD are contending for the resource comprises:

determining that the CDMA code is the only CDMA code available in the wireless coverage area.

5. The method of claim 3, wherein assigning the resource to the second WCD comprises establishing a circuit switched call with the second WCD, the method further comprising:

the CDMA RAN providing, to an LTE RAN, an indication to establish, with the first WCD, a Voice Over Internet Protocol (VOIP) call corresponding to the first call setup request, wherein the VOIP call is established using the first air-interface protocol.

6. The method of claim 2, wherein the RAN comprises:
a CDMA component configured to communicate using the second air-interface protocol; and
an LTE component configured to communicate using the first air-interface protocol.

7. The method of claim 6, wherein the resource is a CDMA code, and wherein assigning the resource to the WCD comprises the CDMA component assigning the CDMA code to the second WCD, the method further comprising:
the CDMA component providing, to the LTE component, an indication to establish, with the first WCD, a VOIP call corresponding to the first call setup request; and
the LTE component assigning, to the first WCD, a respective resource of a respective wireless coverage area defined using the first air-interface protocol.

8. The method of claim 7, further comprising:
establishing, with the first WCD, a Voice Over Internet Protocol (VoIP) call using the LTE component and the first air-interface protocol; and
establishing, with the second WCD, a circuit switched call using the CDMA component and the second air-interface protocol.

9. A non-transitory computer-readable medium having stored thereon program instructions that, upon execution by a radio access network (RAN) device, cause the RAN device to perform functions comprising:
receiving (i) a first call setup request relating to a first wireless communication device (WCD), and (ii) a second call setup request relating to a second WCD, wherein the first WCD is configured to communicate using a first air-interface protocol and is configured to communicate using a second air-interface protocol different from the first air-interface protocol, wherein the second WCD is configured to communicate using the second air-interface protocol and not the first air-interface protocol, and wherein the first WCD and the second WCD are served by the RAN;
determining that the first WCD and the second WCD are contending for a resource of a wireless coverage area defined using the second air-interface protocol; and
based on (i) the first WCD and the second WCD contending for the resource, (ii) the first WCD being configured to communicate using the first air-interface protocol and being configured to communicate using the second air-interface protocol, and (iii) the second WCD being configured to communicate using the second air-interface protocol and not the first air-interface protocol, assigning the resource to the second WCD.

10. The non-transitory computer-readable medium of claim 9, wherein the first air-interface protocol is Long-Term Evolution (LTE), and wherein the second air-interface protocol is Code Division Multiple Access (CDMA).

11. The non-transitory computer-readable medium of claim 10, wherein the RAN is a CDMA RAN, and the resource comprises a CDMA code.

12. The non-transitory computer-readable medium of claim 11, wherein the function of determining that the first WCD and the second WCD are contending for the resource comprises:
determining that the CDMA code is the only CDMA code available in the wireless coverage area.

13. The non-transitory computer-readable medium of claim 11, wherein the function of assigning the resource to the second WCD comprises establishing a circuit switched call with the second WCD, and wherein the program instructions, upon execution by the RAN device, further cause the RAN device to perform functions comprising:
the CDMA RAN providing, to an LTE RAN, an indication to establish, with the first WCD, a Voice Over Internet Protocol (VOIP) call corresponding to the first call setup request, wherein the VOIP call is established using the first air-interface protocol.

14. The non-transitory computer-readable medium of claim 10, wherein the RAN comprises:
a CDMA component configured to communicate using the second air-interface protocol; and
an LTE component configured to communicate using the first air-interface protocol.

15. The non-transitory computer-readable medium of claim 14, wherein the resource is a CDMA code, and wherein assigning the resource to the WCD comprises the CDMA component assigning the CDMA code to the second WCD, and wherein the program instructions, upon execution by the RAN device, further cause the RAN device to perform functions comprising:
the CDMA component providing, to the LTE component, an indication to establish, with the first WCD, a VOIP call corresponding to the first call setup request; and
the LTE component assigning, to the first WCD, a respective resource of a respective wireless coverage area defined using the first air-interface protocol.

16. The non-transitory computer-readable medium of claim 15, wherein the program instructions, upon execution by the RAN device, further cause the RAN device to perform functions comprising:
establishing, with the first WCD, a Voice Over Internet Protocol (VoIP) call using the LTE component and the first air-interface protocol; and
establishing, with the second WCD, a circuit switched call using the CDMA component and the second air-interface protocol.

17. A radio access network (RAN) device comprising:
a processor;
a data storage; and
program instructions, stored in the data storage and executable by the processor, that cause the RAN device to:
receive (i) a first call setup request relating to a first wireless communication device (WCD), and (ii) a second call setup request relating to a second WCD, wherein the first WCD is configured to communicate using a first air-interface protocol and is configured to communicate using a second air-interface protocol different from the first air-interface protocol, wherein the second WCD is configured to communicate using the second air-interface protocol and not the first air-interface protocol, and wherein the first WCD and the second WCD are served by the RAN,
determine that the first WCD and the second WCD are contending for a resource of a wireless coverage area defined using the second air-interface protocol, and
based on (i) the first WCD and the second WCD contending for the resource, (ii) the first WCD being configured to communicate using the first air-interface protocol and being configured to communicate using the second air-interface protocol, and (iii) the second WCD being configured to communicate using the second air-interface protocol and not the first air-interface protocol, assign the resource to the second WCD.

18. The RAN device of claim 17, further comprising:
a Code Division Multiple Access (CDMA) component configured to communicate using the second air-interface protocol; and
a Long-Term Evolution (LTE) component configured to communicate using the first air-interface protocol.

19. The RAN device of claim 18, wherein the resource is a CDMA code, wherein the CDMA component is configured to assign the CDMA code to the second WCD, and wherein program instructions, stored in the data storage, are further executable by the processor to cause the RAN device to:
cause the CDMA component to provide, to the LTE component, an indication to establish, with the first WCD, a Voice Over Internet Protocol (VOIP) call corresponding to the first call setup request; and
cause the LTE component to assign, to the first WCD, a respective resource of a respective wireless coverage area defined using the first air-interface protocol.

20. The RAN device of claim 19, wherein program instructions, stored in the data storage, are further executable by the processor to cause the RAN device to:
establish, with the first WCD, a VoIP call using the LTE component and the first air-interface protocol; and
establish, with the second WCD, a circuit switched call using the CDMA component and the second air-interface protocol.

* * * * *